US006420672B1

(12) United States Patent
Ulrich et al.

(10) Patent No.: US 6,420,672 B1
(45) Date of Patent: Jul. 16, 2002

(54) METHOD AND APPARATUS FOR DETECTING AN INADEQUATE GAS SUPPLY FOR A PLASMA CUTTER

(75) Inventors: James Ulrich, Hortonville; Tim Matus, Appleton, both of WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/822,660

(22) Filed: Mar. 30, 2001

(51) Int. Cl.[7] ............................................ B23K 10/00

(52) U.S. Cl. .......................... 219/121.39; 219/121.55; 219/121.54

(58) Field of Search ...................... 219/121.39, 121.55, 219/121.54, 121.48, 121.59, 74, 75; 313/231.31, 231.41

(56) References Cited

U.S. PATENT DOCUMENTS

| | | | | |
|---|---|---|---|---|
| 4,663,512 A | * | 5/1987 | Kneeland et al. | 219/121.54 |
| 4,791,268 A | | 12/1988 | Sanders et al. | |
| 4,902,871 A | | 2/1990 | Sanders et al. | |
| 5,660,745 A | | 8/1997 | Naor | |
| 5,681,489 A | * | 10/1997 | Carkhuff | 219/212.48 |
| 5,717,187 A | * | 2/1998 | Rogozinski et al. | 219/121.54 |
| 6,242,710 B1 | * | 6/2001 | Naor | 219/121.39 |

* cited by examiner

*Primary Examiner*—Mark Paschall
(74) *Attorney, Agent, or Firm*—George R. Corrigan

(57) ABSTRACT

A method and apparatus for plasma cutting is disclosed. A regulated flow of gas is provided to the torch. Power is also provides to the torch. A controller controls the system and includes a delay circuit. A gas pressure sensor is connected to the torch and/or the gas flow control, and/or the controller. A user indicator is connected to the delay circuit, and the user indicator is activated upon low pressure being detected, and maintained even if the pressure rises.

30 Claims, 1 Drawing Sheet

METHOD AND APPARATUS FOR DETECTING AN INADEQUATE GAS SUPPLY FOR A PLASMA CUTTER

FIELD OF THE INVENTION

The present invention relates generally to the art of plasma cutting. More specifically, it relates to plasma cutters having a gas supply for the cutting torch.

BACKGROUND OF THE INVENTION

Plasma arc cutting, or plasma cutting, is a process in which an electric arc is used to cut a metallic workpiece. Generally, plasma arc cutting uses an electric arc between an electrode and the metal to be cut. The arc creates a plasma that cuts the metallic workpiece. The electrode is part of a cutting torch.

There are a number of known methods of initiating a plasma arc discharge and starting an arc plasma torch (for plasma cutting). Often, a pilot arc is drawn between a cathode and an anode, and an ionizable gas is directed to flow around the arc, creating a plasma jet. The arc is then re-directed to the workpiece.

One common method for starting the pilot arc, called contact starting, uses a specially designed torch and nozzle. An example of a contact start torch is described in U.S. Pat. No. 4,791,268, to N. Sanders, et al., and U.S. Pat. No. 4,902,871, to N. Sanders, et al., hereby incorporated by reference. When an operator triggers the contact start torch, the pilot circuit generates a pilot current between a touching electrode and torch nozzle. Also, a valve in the torch is opened, and an ionizable gas flows through the torch. The gas moves the electrode away from the nozzle, creating a pilot arc therebetween. The plasma torch then is brought near the workpiece to initiate the cutting arc, and the gas flowing through the torch causes the arc to transfer to the workpiece.

Another prior art plasma cutting system and torch is described in Method And Apparatus For A Contact Start Plasma Cutting Process, issued Aug. 26, 1997 as U.S. Pat. No. 5,660,745, and is hereby incorporated by reference.

Generally, prior art plasma systems (also called plasma cutters or plasma cutting power supplies) include a source of gas (such as a tank, shop air, or a compressor), a power supply, a controller, and a torch. The power source typically includes the valve that regulates the flow of gas. A valve may also be included in the torch, or elsewhere between the torch and the source of air.

The system may include a pressure sensor to sense the pressure of the gas supply. If the pressure is low, the controller disables the system—when the trigger is pulled the pilot current will not be provided, and the gas valve in the torch is not opened. An indicator, such as an LED, may be provided to notify the user that an inadequate gas supply caused the system not to initiate when the trigger was pulled. This system works fine when the gas supply is so inadequate that the pressure is too low even when no gas is flowing.

Unfortunately, such prior art system have a drawback. It is possible for the gas supply to be marginally inadequate—provide sufficient pressure when the valve is closed (and no gas is flowing), but provide insufficient pressure when the valve in the torch is opened. Thus, before starting the pressure is adequate. The user pulls the trigger, and when the valve opens the pressure drops (below a desired threshold). This disables this system, and lights the low pressure indicator, or damages components. But, the valve is moved back to the closed position, causing the gas flow to cease. The pressure quickly returns to an acceptable level, and the indicator light is extinguished. Often, the pressure rises so fast that by the time the user looks to determine if an inadequate gas supply is the problem, the light is no longer lit. This causes the user to believe the problem is something other than the gas supply, and can result in downtime, warranty costs, etc. A similar problem can occur for other temporary losses of pressure, such as when the loss occurs after cutting has been performed for a period of time.

Thus, there is a need for a plasma cutter that senses a marginally inadequate gas pressure, and/or to indicate to the user the gas pressure is inadequate, and to maintain that indication even if the pressure returns to an acceptable level.

SUMMARY OF THE PRESENT INVENTION

According to a first aspect of the invention a plasma cutting power supply provides power to a plasma torch. It includes a gas flow control that regulates the flow of gas to the torch and a power source that provides power to the torch. A controller includes a delay circuit. A gas pressure sensor is connected to the torch and/or the gas flow control, and/or the controller. A user indicator is connected to the delay circuit.

According to a second aspect of the invention a plasma cutter for cutting with a torch includes a gas flow control connected to the torch and a power source connected to the torch. A pressure sensor is connected to the gas flow. A comparison circuit is connected to at least one threshold and the pressure sensor, and provides an output connected to the flow control switch, a power disable circuit, and a user-indicator. The user indicator is also connected to a delay circuit.

The sensor is a dynamic sensor in one alternative.

The delay circuit includes a timing delay circuit, a reset input, and a user-selectable reset input in various alternatives. The reset input is connected to the trigger and/or a cutting parameter feedback circuit in additional alternatives.

The controller further includes circuitry to disable the output in response to the gas pressure sensor in another alternative.

According to a third aspect of the invention a method of plasma cutting with a torch includes providing gas to the torch, regulating the gas flow, and providing cutting power to the torch. The gas pressure is sensed and power and gas flow to the torch are halted if the gas pressure is lower than a threshold. A user indicator is activated and maintained even if the pressure rises when the gas flow is stopped.

The pressure is sensed dynamically in one alternative.

The indication is maintained for a predetermined period of time, until the user resets the indicator, or until current flows in the torch in various alternatives.

Other principal features and advantages of the invention will become apparent to those skilled in the art upon review of the following drawings, the detailed description and the appended claims.

Figure 1:
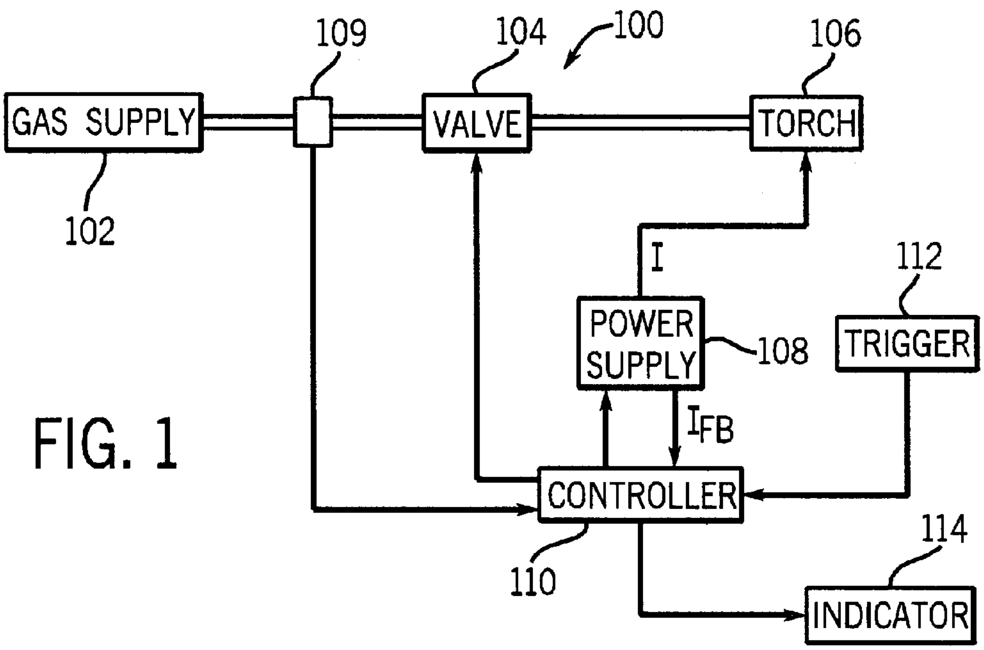
FIG. 1 is block diagram of a plasma cutter constructed on accordance with the preferred embodiment.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular plasma cutter, using particular components, it should be understood at the outset that the invention may be employed in other environments, or implemented using other plasma cutters, and/or other components.

Generally, the invention includes providing an indicator of a temporary or dynamic loss of pressure. The indicator is maintained on even if the pressure recovers. The indicator is preferably activated when the pressure loss is of sufficient magnitude and duration to cause the system to be shut down. But it may also be activated when the pressure loss is not of sufficient duration and/or time to cause the system to be shut down.

The invention is implemented with a Miller Spectrum 300® plasma cutter in the preferred embodiment. The invention includes additional control circuitry (analog or digital) to maintain the indicator even if pressure recovers. The indicator may be a separate LED, maintaining an existing LED lit, flashing the existing LED (the preferred embodiment), an adible alarm, a text display, other visible indicators, other known indicators, or combinations thereof.

A system 100, constructed in accordance with the preferred embodiment is shown in FIG. 1. Details of the system not discussed below are not important to the invention, and may be similar to any plasma cutter. System 100 includes a gas supply 102, a valve 104, a torch 106, a power supply 108, pressure sensor 109, a controller 110, a trigger 112, and an indicator 114.

Gas supply 102 may be a compressor, a gas cylinder, shop air, or other sources of air. If it is a compressor it may be separate from, or integral with, the remainder of plasma cutter 100. Gas supply 102 provides gas through valve 104 to torch 106. Valve may be part of, or separate from, power supply 108 or torch 106. Valve 104 regulates the flow of gas into torch 106 (i.e., it is a flow controller). Valve 104 may include a vent position, such as described in U.S. Pat. No. 5,660,745. Generally, valve 104 is opened and closed in response to a control signal (or control signals) originating in controller 110.

Torch 106 is preferably a torch such as the torch described above, or in the patents incorporated above. However, other torches may also be used. Torch 106 also receives power from power supply 108. Trigger 112 is typically integral with torch 106, and is pulled when the user wishes to begin cutting.

Controller 110 receives as inputs a pressure signal from pressure sensor 109, a current, voltage or power feedback signal from power supply 108, and a trigger signal from trigger 112 (which indicates the users intent to cut). It also receives user-selected parameters from the system control panel, such as desired cutting current. Controller 110 includes circuitry (digital or analog) to process these inputs, and in response thereto provides control-signals to power supply 108, valve 104, and indicator 114. Controller 110 may be on a single circuit board or may be distributed on several boards, or even in several cases. Controller 110 may also control gas source 102. Controller 110 is implemented in the preferred embodiment using a controller of the prior art (modified as set forth below), but the particular circuitry of controller 102 are not relevant to the invention.

Power supply 108 is implemented in the preferred embodiment using a boost converter and a chopper, although the any power topology (such as any converter, inverter, phase control, etc.) could be used. Power supply 108 may receive input power from a utility source, a generator, batteries, or any other source.

Generally, power supply 108 provides current to torch 106. The magnitude of the current is determined by controller 110, and is controlled be controlling switches in the preferred embodiment. Current feedback is obtained from within power supply 108 in the preferred embodiment, but may be obtained from torch 106 or from the cable providing current to torch 106 in other embodiments. Voltage and power feedback may also be provided. Additionally, functions of current, voltage and power (such as derivatives, exponents, etc.), may also be used for feedback.

Pressure sensor 109 senses the pressure of the gas provided to torch 106 (i.e., it is operatively connected thereto). It is located upstream of valve 104 in the preferred embodiment (but may be located downstream of, or be part of valve 104 in alternative embodiments). Pressure sensor 109 may located inside power supply 108, torch 106, gas source 102, or disposed therebetween. Pressure sensor 109, is preferably the sensor found in the Miller Spectrum 300™ or it may be a commercially available pressure sensor. It dynamically senses pressure and provides a voltage output in response thereto in the preferred embodiment.

Indicator 114 is an LED on the system control panel (i.e., the front panel or user interface). It is turned on by controller 110 when pressure sensor 109 senses a low pressure condition (i.e., a pressure lower than a desired threshold). Controller 110 causes indicator 114 to flash if the dynamic pressure rises back above the threshold in the preferred embodiment, and maintains it lit in an alternative embodiment. Indicator 114 is extinguished in response to cutting current or voltage (i.e., cutting parameters), when the trigger is re-triggered when a predetermined time has elapsed, or when a user reset is activated in various embodiments. Indicator 114 is pulsed on and off if the pressure rises above the threshold in one embodiment, to indicate to the user the gas pressure problem is dynamic (and left on when the pressure problem is static and the pressure remains below the threshold). There may be a falling threshold used to determine when the pressure is too low, and another rising threshold used to determine when the pressure has recovered. Two indicators are provided, one for a static pressure problem, and one for a dynamic pressure problem, or indicator 114 may include multicolored lights, audible alarms, a user display screen, or a combination thereof in various alternative embodiments.

Figure 2:
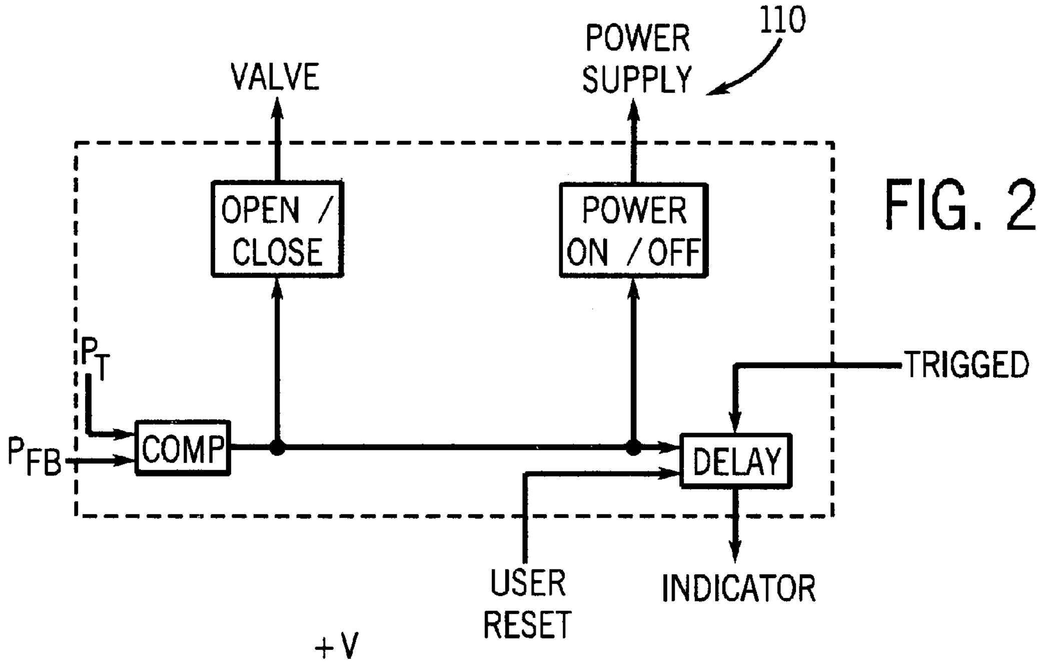
FIG. 2 is a block diagram of a controller used to control the plasma cutter of FIG. 1.

FIG. 2 shows a block diagram, of the portion of controller 110 unique to this invention, and it includes a comparison circuit 201 (circuit, as used herein, includes analog and/or digital components, and/or a microprocessor or a portion thereof), a valve control circuit 203, a power disable (inhibit) circuit 205, and a delay circuit 209. Comparator 201 receives as inputs the sensed dynamic pressure, and a threshold. It provides as an output a signal indicating if the pressure is adequate or inadequate.

The comparator output is provided to valve control signal 203, which causes the valve to be closed (cutting off the gas supply) in the preferred embodiment. Power disable circuit 206 also receives the comparator output signal, and inhibits or disables power supply 205, so that the cutting current is terminated. This protects the system when the gas supply is inadequate. Alternative embodiments provide that the valve is left open, and/or current is not inhibited merely because of an inadequate gas supply.

Delay circuit 209 receives the comparator 201 output as well, and maintains the indicator on (continuously or flashing) even if the pressure recovers. The delay lasts for approximately one minute in the preferred. The delay lasts for other lengths, until the user resets the circuit, until the trigger is re-triggered, or in response to cutting current or voltage. Thus, when the pressure dynamically drops below the threshold, the user is notified, even if the pressure recovers when the trigger is released.

Figure 3:
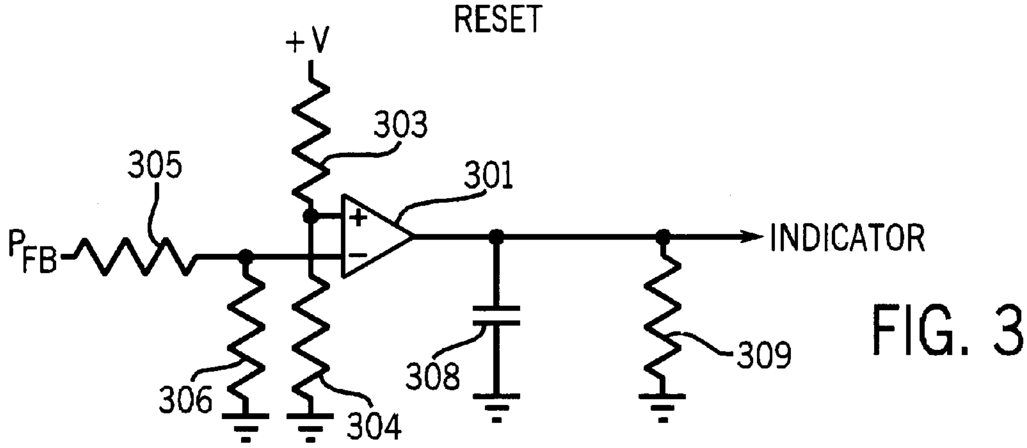
FIG. 3 is a schematic of a comparator circuit with a delay in accordance with the invention.

Comparator 201 and delay circuit 209 and indicator 114 are implemented with a microprocessor in the preferred embodiment. An alternative, analog embodiment is implemented using the circuitry of FIG. 3. An op amp 301 receives a pressure feedback signal P and a threshold signal V through scaling resistors 303–306. When the scaled feedback signal is greater than the threshold the output of op amp 301 is low, and the indicator is not lit. When the feedback signal is less than the threshold, the output of op amp 301 is high, and quickly charges a capacitor 308. A resistor 309 is also provided on the output, and together with capacitor 308 set an RC time constant that determines the time indicator 114 remains on after the pressure feedback signal rises above the threshold. Alternatives include providing resistor 309 in series with a user reset, such that resistor 309 drains capacitor 308 only when the reset is pressed, or discharging capacitor 309 in response to cutting current or voltage, or the trigger is re-triggered.

Numerous modifications may be made to the present invention which still fall within the intended scope hereof.

Thus, it should be apparent that there has been provided in accordance with the present invention a method and apparatus for plasma cutting that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A plasma cutting power supply capable of providing a power to a plasma torch comprising:

a gas flow control disposed to regulate a flow of gas to the torch;

a power source disposed to provide power to the torch;

a controller, including a delay circuit, connected to the power source;

a gas pressure sensor, operatively connected to at least one of the torch and the gas flow control, and further connected to the controller; and a user indicator, connected to the delay circuit, whereby the indicator is maintained for a period of time even if the gas pressure rises.

2. The plasma cutter of claim 1 wherein the gas pressure sensor is a dynamic sensor.

3. The plasma cutter of claim 1 wherein the delay circuit includes a timing delay circuit.

4. The plasma cutter of claim 1 wherein the delay circuit includes a reset input.

5. The plasma cutter of claim 4 wherein the reset circuit includes a user-selectable reset input.

6. The plasma cutter of claim 4 wherein the reset circuit includes a trigger input.

7. The plasma cutter of claim 4 wherein the reset circuit includes a cutting parameter sense input.

8. The plasma cutter of claim 1, wherein the controller further includes an output current disable circuit, responsive to the gas pressure sensor.

9. A plasma cutting power supply capable of providing a power to a plasma torch comprising:

gas means, operatively connected to the torch, for providing gas to the torch and for controlling the flow thereof;

power means, electrically connected to the torch, for providing power to the torch;

control means, operatively connected to the power means, for controlling the power means;

pressure sensor means for sensing the pressure of the gas provided to the torch, and for providing a pressure feedback signal to the control means, wherein the pressure sensor means is connected to the source of gas and the controller; and pressure indicator means for indicating a low pressure condition, wherein the low pressure means is connected to the pressure sensor means; and delay means, for maintaining the low pressure condition indicator, even if the gas presure rises.

10. The plasma cutter of claim 9 wherein the pressure sensor means is further for dynamically sensing pressure.

11. The plasma cutter of claim 10 wherein the delay means includes means for maintaining the delay for a predetermined period of time.

12. The plasma cutter of claim 10 wherein the indicator means includes means for resetting the indicator means.

13. The plasma cutter of claim 12 wherein the means for resetting includes a user-activated reset input.

14. The plasma cutter of claim 12 wherein the means for resetting includes means for resetting in response to a torch trigger signal.

15. The plasma cutter of claim 12 wherein the means for resetting includes means for sensing a cutting parameter in the torch.

16. The plasma cutter of claim 9, wherein the control means includes means for disable output current in response to the gas pressure sensor sensing a low pressure.

17. A method of plasma cutting with a torch comprising:

providing gas to the torch;

allowing gas to flow into the torch;

providing cutting power to the torch;

sensing the pressure of the gas;

stopping power to the torch, gas flow to the torch, and indicating to the user if the gas pressure is lower than a threshold;

maintaining the indication even if the pressure rises when the gas flow is stopped.

18. The method of claim 17 wherein sensing the pressure includes dynamically sensing the pressure.

19. The method of claim 17 wherein the indication is maintained after the pressure rises above the threshold for a predetermined period of time.

20. The method of claim 17 wherein the indication is maintained until the user resets the indicator.

21. The method of claim 17 wherein the indication is maintained after the pressure rises above the threshold until current flows in the torch.

22. A plasma cutter for cutting with a torch comprising:

means for providing gas to the torch;

means for allowing gas to flow into the torch, connected to the means for providing gas to the torch and to the torch;

means for providing cutting power to the torch, connected to the torch;

means for sensing the pressure of the gas, connected to the means for allowing;

means for stopping power to the torch if the gas pressure is lower than a threshold, connected to the means for providing cutting power and the means for sensing;

means for stopping gas flow to the torch if the gas pressure is lower than the threshold, connected to the means for allowing and the means for sensing;

means for indicating to the user if the gas pressure is lower than the threshold, connected to the means for sensing; and means for maintaining the indication even if the pressure rises when the gas flow is stopped, connected to the means for indicating.

23. A plasma cutter for cutting with a torch comprising:

a flow control, in a gas flow path connected to the torch;

a power source, connected to the torch;

a pressure sensor, connected to at least one of the flow control and the torch;

a comparison circuit, connected to at least one threshold and the pressure sensor, and providing at least one comparison output, wherein the at least one comparison output is connected to the flow control;

a power disable circuit, connected to and responsive to the at least one comparison output, and operatively connected to the power source; and a user-indicator connected to the comparison output and to a delay circuit, whereby the indicator is maintained for a period of time even if the gas pressure rises.

24. The plasma cutter of claim 23 wherein the pressure sensor is a dynamic sensor.

25. The plasma cutter of claim 24 wherein the delay circuit includes a timing delay circuit.

26. The plasma cutter of claim 24 wherein the delay circuit includes a reset input.

27. The plasma cutter of claim 26 wherein the reset input is connected to a user-selectable reset.

28. The plasma cutter of claim 26 wherein the reset input is connected to a trigger on the torch.

29. The plasma cutter of claim 26 wherein the reset input is connected to a cutting parameter feedback circuit.

30. The plasma cutter of claim 24, further including a source of gas connected to the flow control.

* * * * *